(12) United States Patent
Berthaud et al.

(10) Patent No.: US 10,917,313 B2
(45) Date of Patent: Feb. 9, 2021

(54) MANAGING SERVICE LEVELS PROVIDED BY SERVICE PROVIDERS

(71) Applicant: International Business Machines Corporation, Armonk, NY (US)

(72) Inventors: Jean-Marc Berthaud, Villeneuve Loubet (FR); Melissa Buco, Amawalk, NY (US); Rong N. Chang, Pleasantville, NY (US); Joel D. Dalsky, Marengo, IL (US); Shih-Chung Fang, Schaumburg, IL (US); Laura Z. Luan, Putnam Valley, NY (US); Lee Tsiao, Barrington, IL (US); Christopher Ward, Glen Ridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 15/617,323

(22) Filed: Jun. 8, 2017

(65) Prior Publication Data
US 2017/0272334 A1 Sep. 21, 2017

Related U.S. Application Data

(63) Continuation of application No. 13/855,962, filed on Apr. 3, 2013, now Pat. No. 9,749,194, which is a (Continued)

(30) Foreign Application Priority Data

Dec. 22, 2004 (EP) ..................................... 04300935

(51) Int. Cl.
*H04L 12/24* (2006.01)
*G06Q 30/02* (2012.01)

(52) U.S. Cl.
CPC ......... *H04L 41/5019* (2013.01); *G06Q 30/02* (2013.01)

(58) Field of Classification Search
CPC ...... H04L 41/5019; H04L 12/24; G06Q 30/02
(Continued)

(56) References Cited

U.S. PATENT DOCUMENTS 5,732,218 A 3/1998 Bland et al.
6,341,265 B1 1/2002 Provost et al.
(Continued)

OTHER PUBLICATIONS

Buco et al.; Utility computing SLA management based upon business objectives; IBM Systems Journal, (Online) vol. 43, No. 1; Mar. 2004; pp. 159-178; XP002362303; www.research.ibm.com/journal/sj/431/buco.pdf.
(Continued)

*Primary Examiner* — Russell S Glass
(74) *Attorney, Agent, or Firm* — Schmeiser, Olsen & Watts, LLP; Nicholas L. Cadmus

(57) ABSTRACT

A method and system for managing at least one service level of a service provided by a service provider to a customer of the service provider under a service level agreement. The service level agreement is a contract between the service provider and the customer. Measurement data and at least one adjudication element associated with a service level of the at least one service level are adjudicated in accordance with the at least one adjudication element such that the adjudication generates a respective adjudicated data point for each data point of the measurement data. The measurement data includes at least one data point measured on a respective resource that provides the service. A modification history chain is generated by: initially establishing the modification history chain as being empty; and adding an identification of each adjudicated element applied to each
(Continued)

data point of the measurement data to the modification history chain.

4 Claims, 4 Drawing Sheets

Related U.S. Application Data continuation of application No. 11/314,373, filed on Dec. 20, 2005, now Pat. No. 8,438,117.

(58) Field of Classification Search
USPC .......................................................... 705/302
See application file for complete search history.

(56) References Cited

U.S. PATENT DOCUMENTS

| | | | |
|---|---|---|---|
| 6,363,053 | B1 | 3/2002 | Schuster et al. |
| 6,366,563 | B1 | 4/2002 | Weldon et al. |
| 6,473,794 | B1 | 10/2002 | Guheen et al. |
| 6,512,746 | B1 | 1/2003 | Sand |
| 6,553,568 | B1 | 4/2003 | Fijoick et al. |
| 6,701,342 | B1 | 3/2004 | Bartz et al. |
| 6,957,186 | B1 | 10/2005 | Guheen et al. |
| 7,065,496 | B2 | 6/2006 | Subbloie et al. |
| 7,130,807 | B1 | 10/2006 | Mikurak |
| 7,165,041 | B1 | 1/2007 | Guheen et al. |
| 7,228,255 | B2 | 6/2007 | Berthaud et al. |
| 7,555,408 | B2 | 6/2009 | Berthaud et al. |
| 8,438,117 | B2 | 5/2013 | Berthaud et al. |
| 9,749,194 | B2 * | 8/2017 | Berthaud ............ H04L 41/5019 |
| 2002/0049841 | A1 | 4/2002 | Johnson et al. |
| 2002/0120741 | A1 | 8/2002 | Webb et al. |
| 2002/0143920 | A1 * | 10/2002 | Dev ........................ H04L 41/06 709/223 |
| 2002/0167936 | A1 | 11/2002 | Goodman |
| 2003/0053455 | A1 | 3/2003 | Kryskow, Jr. |
| 2003/0145080 | A1 | 7/2003 | Breese et al. |
| 2003/0179703 | A1 | 9/2003 | Levy et al. |
| 2003/0185212 | A1 | 10/2003 | Kelly et al. |
| 2003/0187966 | A1 | 10/2003 | Sinha |
| 2003/0198235 | A1 | 10/2003 | Weldon et al. |
| 2004/0136379 | A1 | 7/2004 | Liao et al. |
| 2013/0227130 | A1 | 8/2013 | Berthaud et al. |

OTHER PUBLICATIONS

Bhoj et al.; SLA management in federated environments; Computer Networks, Elsevier Science Publishers B.V., Amsterdam, NL, vol. 35, No. 1; Jan. 2001; pp. 5-24; XP004304815; ISSN: 1389-1286.

Office Action (dated Oct. 2, 2006) for U.S. Appl. No. 11/314,375, filed Dec. 20, 2005; Confirmation No. 6860.

Dec. 27, 2006 Response filed for Office Action (dated Oct. 2, 2006) for U.S. Appl. No. 11/314,375, filed Dec. 20, 2005; Confirmation No. 6860.

Notice of Allowance (dated Jan. 3, 2013) for U.S. Appl. No. 11/314,373, filed Dec. 20, 2005; Confirmation No. 6796.

Melissa Buco, Managing eBusiness on Demand SLA Contracts in Business Terms Using the Cross-SLA Execution Manager SAM, Proceedings of the Sixth International Symposium on Autonomous Decentralized Systems (ISADS'03), Apr. 9-11, 2003, pp. 1-8.

Anne Brazao, Improve service levels with meaningful measurement, Jul. 2000, Communications News; 37, 7; ABI/INFORM Global p. 88-89.

Office Action (dated Aug. 26, 2016) for U.S. Appl. No. 13/855,962, filed Apr. 3, 2013.

Amendment (dated Nov. 28, 2016) for U.S. Appl. No. 13/855,962, filed Apr. 3, 2013.

Final Office Action (dated Feb. 3, 2017) for U.S. Appl. No. 13/855,962, filed Apr. 3, 2013.

Final Amendment (dated Apr. 3, 2017) for U.S. Appl. No. 13/855,965, filed Apr. 3, 2013.

Notice of Allowance (dated Apr. 18, 2017) for U.S. Appl. No. 13/855,962, filed Apr. 3, 2013.

* cited by examiner

MANAGING SERVICE LEVELS PROVIDED BY SERVICE PROVIDERS

CROSS REFERENCES TO RELATED INVENTIONS

This application is a continuation application claiming priority to Ser. No. 13/855,962, filed Apr. 3, 2013, now U.S. Pat. No. 9,749,194 issued Aug. 29, 2017, which is a continuation of Ser. No. 11/314,373, filed Dec. 20, 2005, U.S. Pat. No. 8,438,117, issued May 7, 2013.

This invention is related to U.S. patent application Ser. No. 11/314,375 or U.S. Pat. No. 7,228,255 entitled "ADJUDICATION MEANS IN METHOD AND SYSTEM FOR MANAGING SERVICE LEVELS PROVIDED BY SERVICE PROVIDERS", filed on even date herewith, and U.S. patent application Ser. No. 11/314,301 or US Patent publication USPN 2006-0133296A1 entitled "QUALIFYING MEANS IN METHOD AND SYSTEM FOR MANAGING SERVICE LEVELS PROVIDED BY SERVICE PROVIDERS", filed on even date herewith.

BACKGROUND OF THE INVENTION

1. Technical Field

The invention relates to service management and service presentation systems, wherein measurement data regarding services delivered by Service Providers to customers are gathered and handled to compute and communicate service indicators defined in service level agreements and, in particular, relates to a method for managing the service levels provided by Service Providers.

2. Related Art

A Service Provider (SP) provides, hosts, or manages resources for its customers. A resource can be a server, a particular application on a server, a networking device, people in a help desk to answer users, people to fix problems, people to manage and change systems configuration and location, . . . etc. . . . or a complex solution made of multiple elements to accomplish or support a customer business process. The Service Provider and the customer can be different firms, or different departments in a large global enterprise where departments are organized as support services for other departments, e.g. Marketing, Research, Sales, Production.

Normally, a Service Level Agreement (SLA) is executed (i.e., signed) between a provider and a customer to define the role of each party and to remove any ambiguity from the business relationship. Such a SLA:

Identifies the parties involved in the agreement.

Describes the service to be provided, and identifies in a measurable and quantifiable manner indicators of the quality of the service on which obligations will be set, with a possible series of exceptions and stipulations in the way to calculate these indicators.

Defines the obligations, called Service Levels (SLs), to be met on the identified indicators, so that the expected quality of the delivered services is set in an un-ambiguous manner.

Defines the agreement period for which these obligations are set forward.

Pre-defines penalties to be paid/executed by the SP if the commitment(s) is not met. If a commitment is exceeded, a reward can also be predefined, to be paid by the customer.

Also defines reporting policies, corrective actions, dispute resolution procedures, termination criteria, intellectual property.

A SLA is encountered when considering utilities to be trusted "always-on" services such as providing water, electricity, gas, telephone, e-service (e.g., e-Business On Demand), etc. In fact, a SLA exists when a specific service offer including commitments is engaged with a customer.

By itself, a SLA does not bring any change in the level of service delivered. The Service Provider and/or the customer need to implement a Service Level Management (SLIM) program that will actually result in higher levels of services. Indeed, a SLA only specifies the agreed criteria for determining whether or not a set of agreed service quality levels are met. When not met, the issue is to determine what caused the violation, maybe how to improve the service, or change the SLA or the provider. The Service Level Management begins with the development of new service levels for a new contract and continues throughout the life of the contract to ensure Service Level commitments are met and maintained.

The Service Level Management is commonly identified as the activities of:

negotiating, identifying and agreeing the measurable services that support the Business Process of a customer, and defining the SLA articulation in an offering for service with Service Level Objectives (SLO) also known as Service Level Targets (SLT), monitoring resources used to deliver a service and capturing data on how well these resources perform from monitors or from logs, calculating intermediate and high level Service Levels results or scores using the predefined service parameters formulae (called metrics) and taking into account all kinds of exceptions that can occur, assessing attainment versus commitments and possible penalties or rewards, assessing impact of operational outages or degradations in terms of SLAs (services) and financial impacts, alerting in real-time of possible or effected outages, diagnosing problems for resolution, enforcing corrective actions wherever possible to regulate the delivery system and therefore try to proactively guarantee the achievement of obligations, reporting to the provider and the customer on real numbers versus contractual numbers, and sealing final numbers to be used for rebates or rewards, rebating to customers when commitments are not achieved, or rewarding the provider when commitments are exceeded, and refining, improving and reviewing SLA definitions, service levels and services that support the customer's Business Process.

Today, there are SLA Management Systems which are automated for managing SLAs such as IBM Tivoli Service Level Advisor, Computer Associates SLM, Digital Fuel or InfoVista. They are built to accomplish, at least, a minimum set of tasks such as capturing data from monitoring systems, and they participate or supply information to other service management activities such as alerting, enforcing or reporting.

However, these systems provide no complete answer to the service level management problem. Indeed, very often a piece of the solution used to support the customer business process which is managed by the Service Provider is corning from the customer, or is under the customer's responsibility (shared or not with the Service Provider). The means used by these systems do not automatically take such situations into account where an SLA is violated due to Customer's responsibility. In such cases, the result must be revised to reflect the true responsibility of the SP only after calculation by these systems.

In addition, when a SLA is violated, or when the SP is attempting to improve its delivered service, a lot of investigation can be done on monitoring data, and it has to take into account the problem expressed above. These SLA Management Systems do not provide any help on these tasks which can then be time consuming and not very efficient, or require the use of other complex and costly means to implement external tools for correlation between data and results.

SUMMARY OF THE INVENTION

The present invention provides a method for managing at least one service level of a service provided by a service provider to a customer of the service provider under a service level agreement, said service level agreement being a contract between the service provider and the customer, said method comprising:

adjudicating measurement data to correct the measurement data in accordance with at least one adjudication element that provides information relating to how to correct the measurement data, said information in each adjudication element identifying which data of the measurement data is to be changed by said each adjudication element;

transforming the adjudicated measurement data into operational data by reorganizing the adjudicated measurement data into one or more groups of data;

evaluating the operational data by applying a formula to the operational data, resulting in the operational data being configured for being subsequently qualified; and qualifying the operational data after said evaluating, said qualifying comparing the evaluated operational data with specified service level targets for at least one service level period during which the service has been performed, said qualifying identifying from said comparing data points selected from the group consisting of good data points of the operational data meeting the specified service level targets, bad data points of the operational data not meeting the specified service level targets, and combinations thereof, wherein said adjudicating, transforming, evaluating, and qualifying are performed by software modules of an execution engine.

The present invention provides a system for managing at least one service level of a service provided by a service provider to a customer of the service provider under a service level agreement, said service level agreement being a contract between the service provider and the customer, said system comprising an execution engine for performing a method, said method comprising:

adjudicating measurement data to correct the measurement data in accordance with at least one adjudication element that provides information relating to how to correct the measurement data, said information in each adjudication element identifying which data of the measurement data is to be changed by said each adjudication element;

transforming the adjudicated measurement data into operational data by reorganizing the adjudicated measurement data into one or more groups of data;

evaluating the operational data by applying a formula to the operational data, resulting in the operational data being configured for being subsequently qualified; and qualifying the operational data after said evaluating, said qualifying comparing the evaluated operational data with specified service level targets for at least one service level period during which the service has been performed, said qualifying identifying from said comparing data points selected from the group consisting of good data points of the operational data meeting the specified service level targets, bad data points of the operational data not meeting the specified service level targets, and combinations thereof, wherein said adjudicating, transforming, evaluating, and qualifying are performed by software modules of an execution engine.

DETAILED DESCRIPTION OF THE INVENTION

The present invention provides a method and system for managing the Service Levels provided by Service Providers to a customer by introducing a step of modification of input data (adjudication) taking into consideration external information elements related to input data (adjudication elements) such as the SLA contract clauses, or such as input from the service manager or other enterprise management systems, in order to produce new modified input data for Service Level calculations and then to qualify the resulting detailed calculation data (operational data) with regards to their participation in achieving or not Service Level Targets.

The invention relates to a system for managing a service level provided by a Service Provider to a customer comprising a processing engine for transforming measurement data into operational data using service time profiles and Services Level business logics, and evaluating the operational data in order to produce Service Level results and qualified operational data. The processing engine comprises means for adjudicating the actual measurement data before transforming them into operational data, this adjudication being made by using a set of adjudication elements describing the modifications to bring, means for evaluating the operational data by applying SLA specified service level evaluation formula, and means for qualifying operational data after they have been evaluated, this qualification being made by comparing operational data with qualification values determined with regard to Service Level targets for each business period (i.e., service level period).

A system according to the invention comprises a repository of the descriptions of the Service Level Agreement (SLA) corresponding to each Service Level (SL), a first datastore for the actual measurement data, a second datastore for adjudication elements, a third datastore for SL results, operational data, adjudicated data and a processing engine for processing an evaluation cycle for each Service Level.

Figure 1:
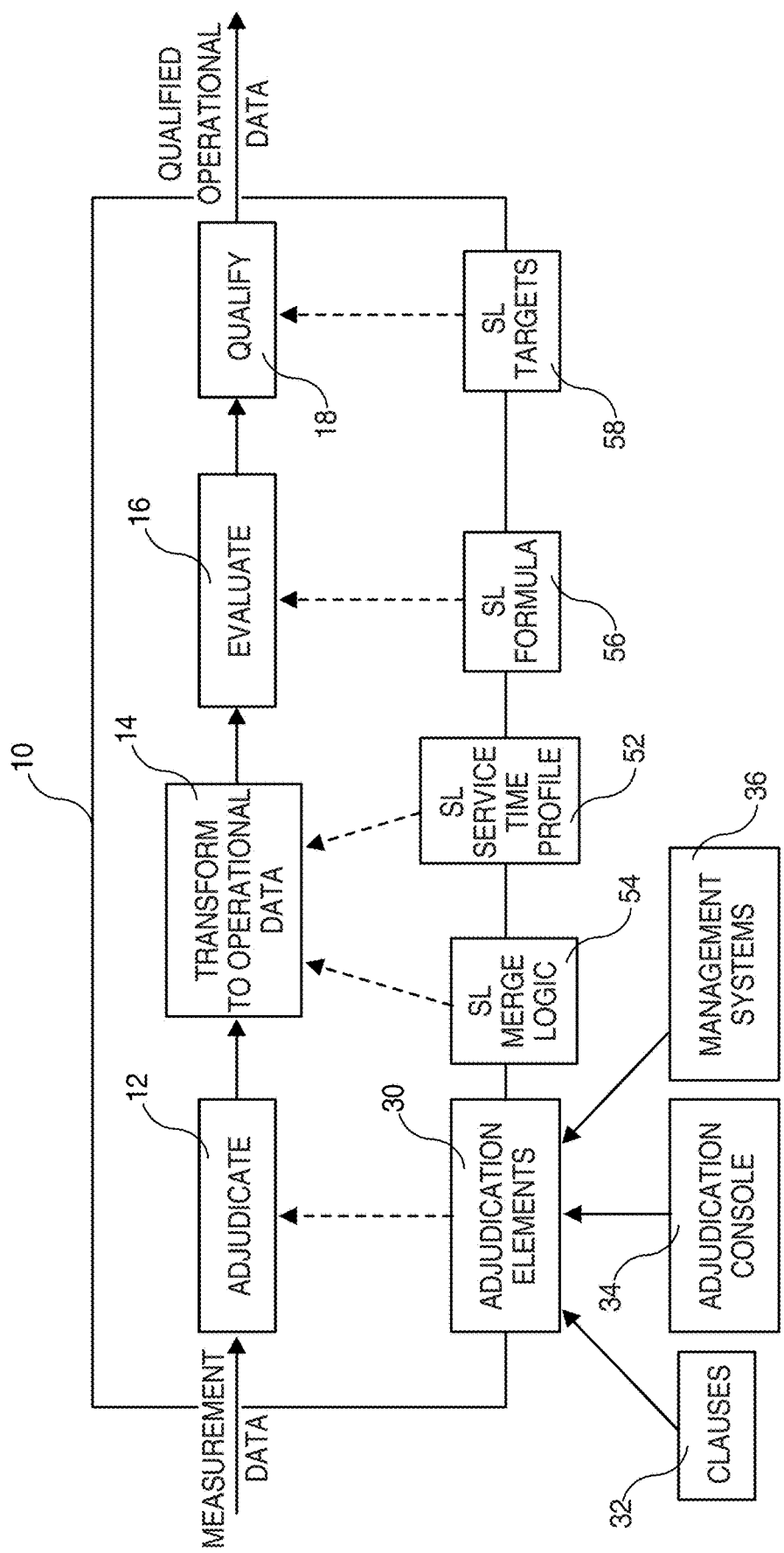
FIG. 1 is a schematic block-diagram representing a processing engine used in the present invention and a sequence of steps implemented therein.
Figure 2:
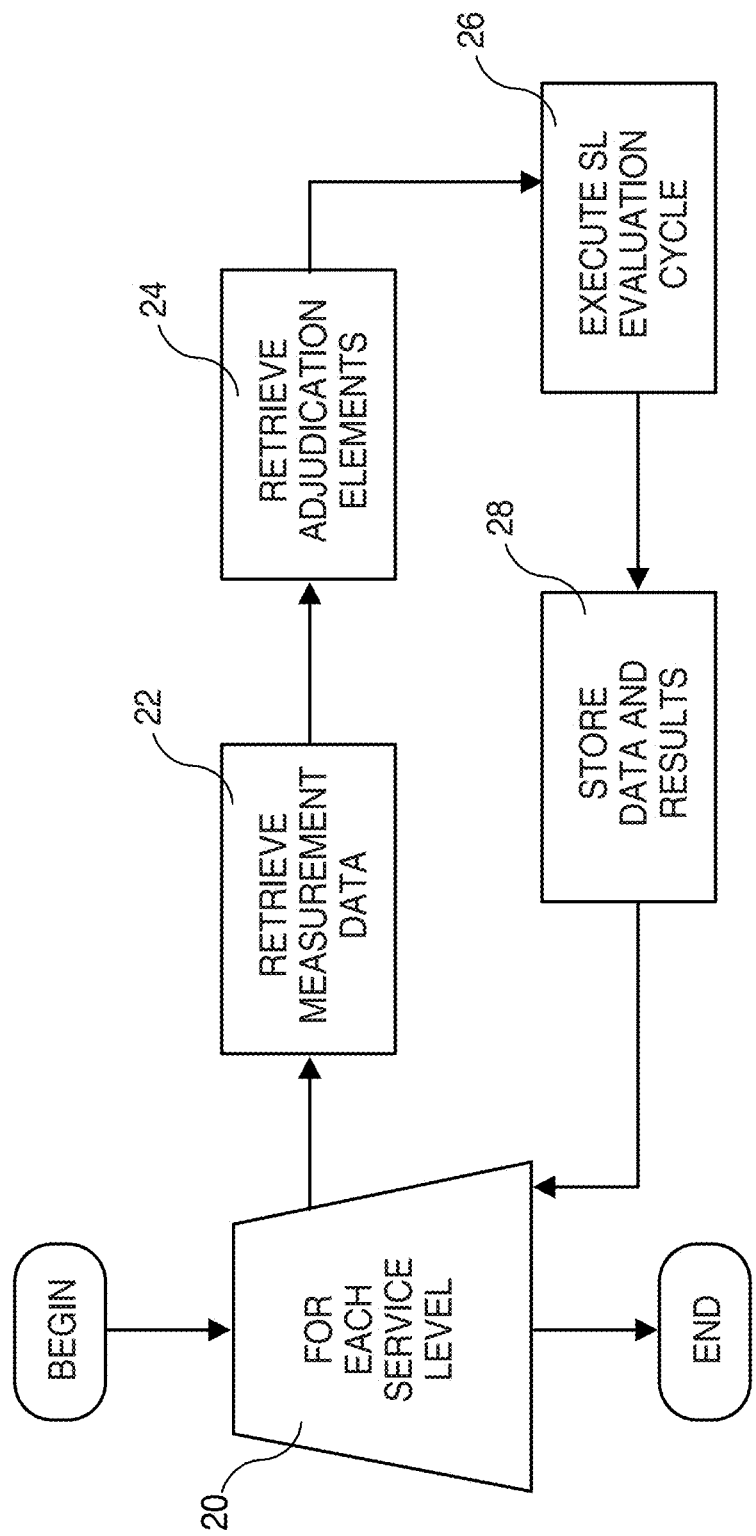
FIG. 2 is a schematic diagram illustrating the processing cycle implemented for each service level, in accordance with embodiments of the present invention.

The processing engine 10, illustrated in FIG. 1, includes software modules of a computer system to process the measurement data received as input and to provide qualified operational data as output. As described hereafter, the process performed by the processing engine 10 comprises essentially four main steps: a step of adjudicating the input measurement data (step 12); a step of transforming the adjudicated data into operational data (step 14); a step of evaluating these operational data (step 16); and a step of qualifying the operational data (step 18). In other words, as illustrated in FIG. 2, the process is implemented for each Service Level (SL) 20. First, the measurement data for the service level is retrieved (step 22), such measurement data being related to the evaluated SL period (i.e., business period), Then, all the adjudication elements related to the evaluated SL period are retrieved (step 24) from the second datastore for the adjudication elements and the SL evaluation cycle can be executed (step 26) as per SLA descriptions. Finally, the adjudicated data, the qualified operational data, and the SL results are stored (step 28) into the third datastore.

Referring again to FIG. 1, the step 12 of adjudicating is used to correct the actual measurement data to reflect the real domain of responsibility of the Service Provider, or to reflect reality because, for some reason, the monitors provide incorrect data. A new set of adjudicated data is produced by this step. Although the actual measurement data are different from the adjudicated ones, reference data to the actual measurement data are still available to be used by other systems requiring the original observed data, or so that changes can be audited in support of legal purposes.

Adjudication elements 30 provide information relating to how to correct the measurement data. The adjudication elements 30 may be sourced from the contract clauses 32 created at contract signing time and are valid for the whole Service Level life (exclusion cases, special conditions, limits on resources, etc.). The adjudication elements 30 may also be created, from the adjudication console 34, at any time during the Service Level life by Service Managers when executing their Service Level Management tasks. Finally, the adjudication elements 30 may be created automatically from other Enterprise Management systems 36 like Problem and Change Management, using responsibility fields and other information. The adjudication elements 30 hold a reason for the modifications they bring, which will be shown to the end customer and must be agreed by the customer, and information about the creator who/which is first authenticated and goes through processes of authorization.

Each "modified" (i.e., adjudicated) data point contains a list of references to applied adjudication elements and clauses in their specific order of appliance, for auditing, detailed reporting/explanation, customer relationship, legal justification and later billing exploitation (rebate or reward). Each adjudication element 30 is persistently saved/locked into an unchangeable state as soon as it is used so that no more modification can happen to the locked adjudicated element, for guaranteeing that proper information is available for auditing controls.

This step also supports a parallel information management process whereby the adjudication can be sealed so that no more modification can be made to the Service Level result and other produced data for a given Service Level period; i.e. no more adjudication element can be created for this Service Level period. This corresponds to a process of finalization just before result data is sent to billing systems or used for other legal purposes, and after they have been reviewed and agreed upon with the customer.

Figure 3:
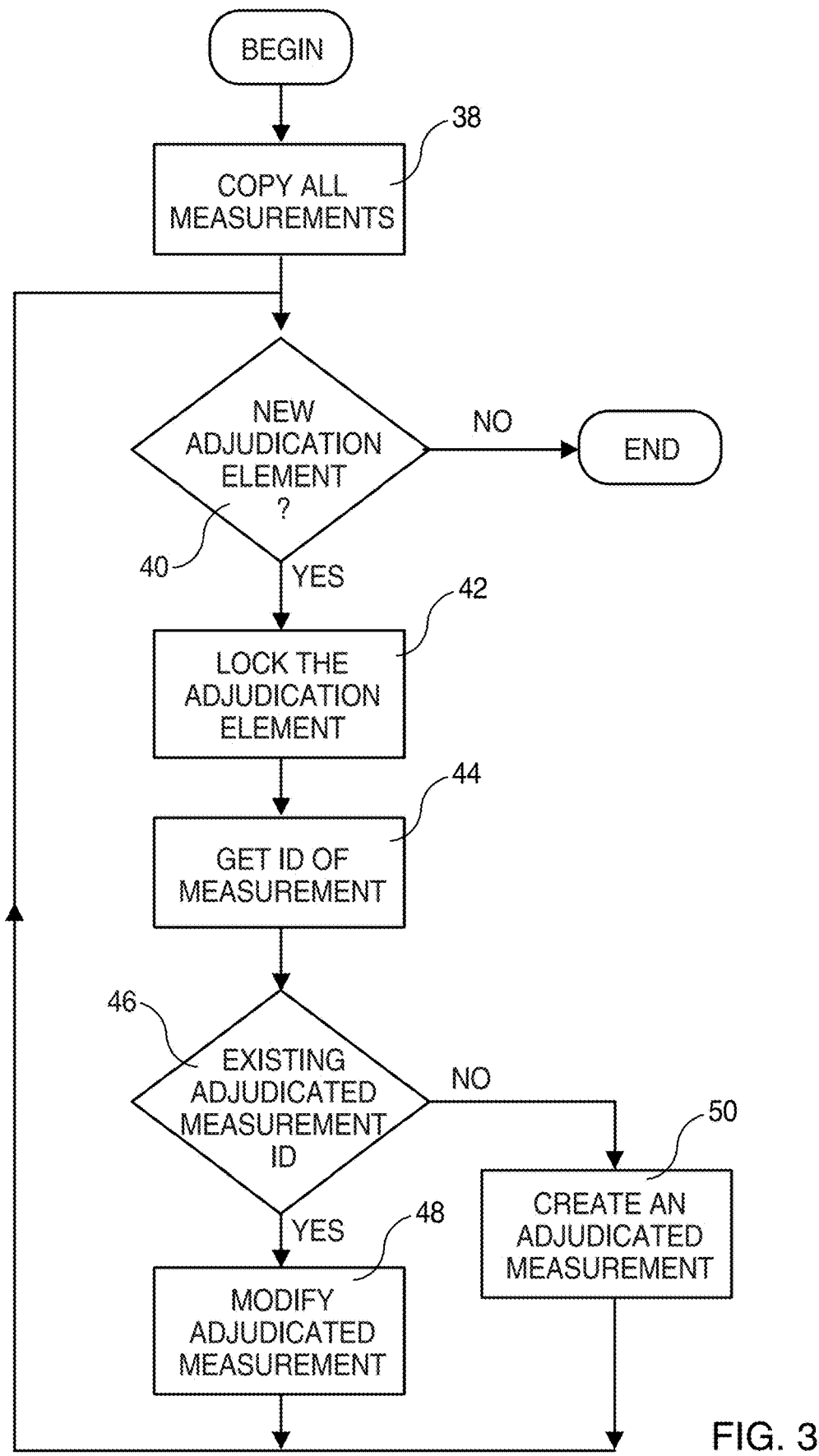
FIG. 3 is a flow chart of steps implemented in the process of adjudicating the measurement data, in accordance with embodiments of the present invention.

Each time an SL is requested to be evaluated, the process illustrated in FIG. 3 is executed. First, all measurements are copied as adjudicated measurements with an empty modification history chain (step 38), thus enabling to store a history of modifications to each measurement. Then, the process checks re is still an adjudication element to apply (step 40) to the set of adjudicated measurements. If it is the case, the adjudication element is locked as mentioned above (step 42) and the identification of the measurement data to be changed from the adjudication element is got (step 44). Then, it is checked whether it corresponds to an existing adjudicated element identification (step 46). If so, the adjudicated measurement contents are replaced by the contents specified in the adjudication elements and the adjudication element identification is added to the modification history chain (step 48). If it is not the case, a new adjudicated measurement is created with this identification and filled with the contents specified in the adjudication element and this adjudication element is added to the modification history chain (step 50). In both cases, the process is looped back to the step of checking whether there is still an adjudication element to apply (step 40).

Returning to FIG. 1, the second step 14 performed by the processing engine 10 is to transform the adjudicated measurement data into operational data by using a service time profile 52 describing the Service Level time logic (also commonly referred to as a service calendar and defining different periods of service with possibly different SLT's) and the specific business logic defined in the Service Level. The second step 14 organizes/merges the adjudicated measurement data into a more appropriate form for evaluating attained service levels and producing summary service level results. In addition, each produced operational data point refers back to the original adjudicated measurement data point(s) it comes from, for tracing and auditing purposes. For example, a Service Level time logic can contain critical periods and off-peak hours in a month where different targets are to be achieved, or periods of no service (i.e., the service level targets may be a function of time or time-varying during the business period(s) in which the measurement data was obtained). Monitoring devices and data collection systems have no knowledge of this information which is contract specific, and a measurement data point can cover multiple such periods. Appropriate sets of data points need to be produced for generation of service level results and comparison with different service level targets. And to continue the example, if measurements are coming from different probes monitoring the same resource, they need to be merged using a logic 54 specified in the Service Level before they can be used for Service Level calculations when evaluating and producing summary service level results.

The adjudicated data may be transformed into operational data by being reorganized into one or more groups of data. As an example, the step of transforming the adjudicated data into operational data may be decomposed in two sub-steps. This example illustrates how adjudicated data are propagated to the next steps of the evaluation process.

1. Merging of several measurement data (i.e., a plurality of sets of measurement data the same monitored resource, independently from the SL Service Time Profile (or business schedule), into a single set of data. This part defines precisely the format of initial and transformed data, and since they are precisely identified and defined, the description of the SL business logic to merge data can be itself a program, supplied by people who have defined the Service Level with the customer, or by the customer himself.

The merging step gathers adjudicated measurements per measurement type id, and at the same time it creates a pre-operational data point (i.e. an operational data point with no business schedule state) for each adjudicated data point, keeping the adjudicated values as they are and a reference to the original adjudicated data point. Then, it selects for each group the corresponding business logic from the SL information, and for each group, it applies the merge logic to produce a new set of pre-operational data points per group. How the merge logic is executed on the data points is implementation dependent: this can be an interpreter, a dynamic call to a compiled form of the logic, etc.

As an example, 3 probes are monitoring a URL, and it is defined in the SL that an outage is declared when all 3 probes agree to see an outage, and that this outage lasts from the first probe measurement detecting it to the first probe measurement returning to normal. In this case, only one measurement type is seen, i.e. observed URL state, so there will be only one group, based on a common feature of the 3 groups wherein the common feature is the only one measurement type. 3 measurements feeds come in, identified by their different monitoring resource ids. To further simplify, each data point can only mention an outage time and duration for the given resource id/probe. There is no need to show records of observed normal state, since by default, what is not an outage means is available.

After being adjudicated, these measurement data are put in one group of measurement, and then merged using the supplied logic. In this case, the formal logic supplied can be:
build one data set of pre-operational points sorted by measurement timestamp filed, from the group of data sets,
go through each non excluded point in sorted order, and see if the time interval it describes (timestamp, timestamp+duration) overlaps with the time interval of two following or simultaneous points with different resource ids,
if yes, create a new operational data point from these 3 points using the operational data point creation tool, and set the timestamp to the one of the current point, and the duration to the minimum of (timestamp+duration) of the 3 points minus this point timestamp, discard the 3 operational data points used to create this one, and insert this one in the sorted list instead, retaining in it the list of original adjudicated data points.
if not, discard the data point.

2. Split of measurement data against service Time Profile periods (Service Level time logic) to create separate sets for each period. This step allows applying the same process in parallel to each set of data without caring anymore about the Service Time Profile before getting to the SL result comparison stage.

The split step takes as input the output of the previous step, that is pre-operational data points with no business schedule state set yet. The external input of this step is a calendar showing the active business state for each time in the processed Service Level.

The logic of this step is:
a—for each pre-operational data point, get the business state for the data point timestamp from the calendar, and set it for the new operational data point,
b—if the point is a summary point (i.e. not a unique point in time, but covers a time range), look at the calendar to check if the business state changes before the end time of the interval covered by the summary point,
c—if yes, create a new operational data point from this point. Set the timestamp of this new point to the time of change of the business state, set its business period state to this new state, and set its end time or duration to match with the end of the current point. Set the end time or duration of the current point to the time of change of the business state.

Then, restart sub-step c—using the new operational data point.

As an example, if an outage lasts from 3 pm to 11 pm and the Service Time Profile states that in a day, 8 am to 8 pm is normal hours, and outside of 8am to 8 pm is off peak hours with a different target, then the outage needs to be split in two pieces, one from 8 pm to 8 pm with business period state as "normal hours", and one from 8 pm to 11 pm with business period state as "off peak hours".

The preceding example illustrates splitting the single set f data (resulting from the preceding merging step) into a plurality of groups of data corresponding to a plurality of sub-periods (3 pm to 8 pm and 8 pm to 11 pm in the preceding example) of the business period(s) during which the measurement data was gathered.

Then, the operational data are evaluated (step 16) through a Service Level evaluation using a formula 56, specifying which data are to be fed as input, what is the form of data (response time, availability, counts, states), and how the input data should be processed to produce summary intermediate and top Service Level attainment results. There is one set of data produced per business period in the Service Time Profile. The data produced by this step are to be used directly for Service Level attainment comparison, for reporting on service levels, and for input to other Enterprise Management systems. It is matched against what is contractually committed by the provider and represents a negotiated value and quality of the delivered service. The operational data resulting from the evaluation step 16 are configured for being qualified.

The operational data resulting from adjudicated data are qualified (step 18) with regards to their participation in achieving or not achieving the Service Level targets 58 for each business period during which the service(s) provided by the Service Provider has been performed. The qualifying step identifies good operational data points with labels like "In Profile" (=contributes to good SL result) or bad operational data points with labels like "Out Of Profile" (=contributes to degrading SL result). The qualifying step also determines deltas to breaking limit (i.e., differentials by which the identified data points differ from the specified service level targets). The deltas to breaking limit (i.e., differentials) are used to determine a margin by which the identified good and/or bad data points contribute to the high level SL results; i.e., contribute to meeting or not meeting the specified service level targets (for example, time remaining before "Out Of Profile" or violation for problem resolution times). The deltas to breaking limit (i.e., differentials) and the margin may be stored in the third datastore.

This enriching of operational data is to be used by the Service Provider Managed Operations people and by their automated systems to continuously track the detailed contribution to the end to end final service level, to understand their impact on it, and to help them prioritize work and actions in order to guarantee the end to end service level. As an example of the latter, the time remaining before violation for problems resolution is an information to be used to understand which problems to solve first in the list of currently open problems. As an example of the former, showing which detailed metrics contribute to SL result degradation helps to pinpoint quickly in the input data set what are the points to improve, and to control the effect of corrective actions. This is possible because each operational data point points back to adjudicated data, which in turn has in its history the list of modifications made to the initial data points. In addition, the delta to breaking limit information gives an idea of the amount of effort to spend to improve the service level, and of where to concentrate to yield best benefits.

The qualification implementation process requires the creation of a rule for each type of operational data which is used to qualify them. This results in a set of qualification rules specific to each Service Level. Each operational data produced by the previous steps in the Service Level evaluation cycle has a data code associated with it that is used to retrieve the qualification rule to apply for this service level and for the business period it is in.

These rules can be in executable code and they are executed on each operational data at qualification time, or they can be description of tests to be done and conditions to be met and they are interpreted at qualification time also. Each rule is dependent on the service level evaluation formula and target. There can be some commonality between multiple service levels or not, and in case of commonality, the files can be shared.

Figure 4:
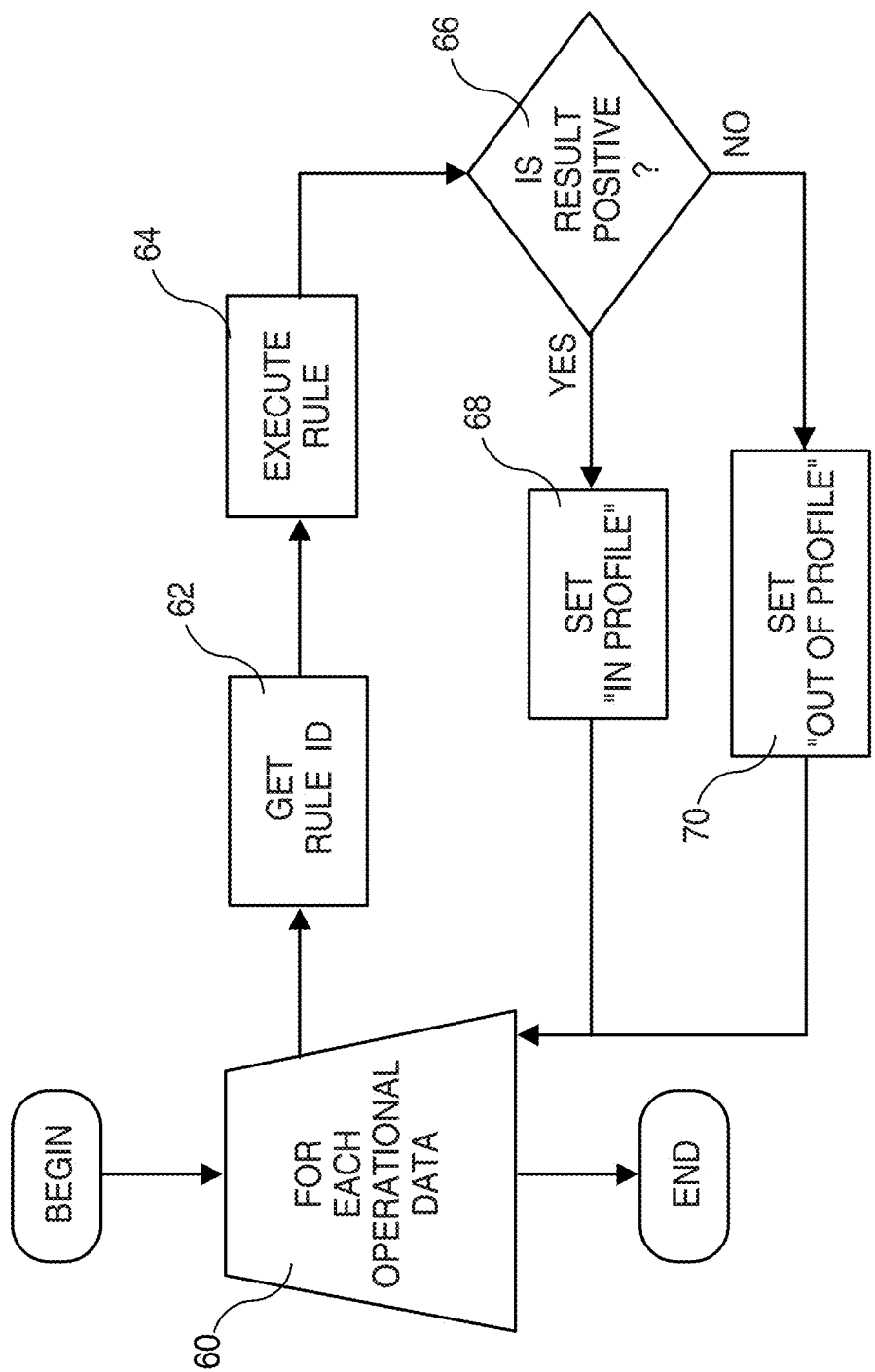
FIG. 4 is a schematic diagram illustrating the process for creating a rule in the step of qualifying the operational data, in accordance with embodiments of the present invention.

The process for creating a rule is illustrated in FIG. 4, for each operational data, a rule identification is got 62 in a table of rules using the operational data type id, the service level id and the business period id. The rule is then executed or interpreted 64 in comparison with the operational data. Then, it is checked 66 whether the result is positive. If it is the case, the operational data are qualified as "In Profile" 68 and, if not, the operational data are "Out Of Profile" 70. The result is stored as delta (i.e., differential) to target, to be used as explained above.

For example, the SLA defines that 95% of URL response time measurements should be less than 2 seconds. Operational data produced by this SL evaluation is a list of response time measurements spread over the evaluation period and the 95th percentile value of the measurement list. In this case, it is possible to use one qualification rule only common to both types of operational data set. This rule is to compare the response time operational data value with 2 seconds and to answer positively (In Profile) if less than or equal or else negatively (Out Of Profile), and to store the delta in the operational data point.

What is claimed is:

1. A method, said method comprising:
    retrieving, by a processor from a datastore, at least one adjudication element;
    said processor adjudicating measurement data for a service level in accordance with at the retrieved least one adjudication element, wherein the at least one adjudication specifies how to correct the measurement data, wherein said adjudicating generates adjudicated data comprising a respective adjudicated data point for each data point of the measurement data, wherein the measurement data comprises at least one data point measured on a respective resource, and wherein the adjudicated data comprises sets of adjudicated data corresponding to sets of measurement data on a same monitored resource, wherein the measurement data are stored in the datastore;
    said processor locking each adjudication element into an unchangeable state after being used in said adjudicating;
    said processor sealing said adjudicating for a first period of time such that additional adjudication of the measurement data cannot be subsequently performed for the first period of time;
    generating a modification history chain by: said processor initially establishing the modification history chain as being empty; and said processor adding an identification of each adjudicated element applied to each data point of the measurement data to the modification history chain;
    said processor transforming the adjudicated measurement data into operational data by: merging sets of the adjudicated data into a single set of data based on a feature that is common to the sets of adjudicated data; and splitting the single set of data into a plurality of groups of data corresponding to a plurality of sub-periods of the at least one period of time during which the service has been performed; and
    said processor qualifying the operational data by: determining differentials by which the identified data points differ from specified targets; and determining, from the differentials, a margin by which the identified data points contribute to meeting or not meeting the specified targets, wherein said qualifying identifies data points selected from the group consisting of good data points of the operational data meeting the specified targets, bad data points of the operational data not meeting the specified targets, and combinations thereof.

2. The method of claim 1, wherein the measurement data are stored in the datastore.

3. A system, said system comprising a processor and an execution engine for performing a method using the processor, said method comprising:
    retrieving, by the processor from a datastore, at least one adjudication element;
    said processor adjudicating measurement data for a service level in accordance with at the retrieved least one adjudication element, wherein the at least one adjudication specifies how to correct the measurement data, wherein said adjudicating generates adjudicated data comprising a respective adjudicated data point for each data point of the measurement data, wherein the measurement data comprises at least one data point measured on a respective resource, and wherein the adjudicated data comprises sets of adjudicated data corresponding to sets of measurement data on a same monitored resource, wherein the measurement data are stored in the datastore;
    said processor locking each adjudication element into an unchangeable state after being used in said adjudicating;
    said processor sealing said adjudicating for a first period of time such that additional adjudication of the measurement data cannot be subsequently performed for the first period of time;
    generating a modification history chain by: said processor initially establishing the modification history chain as being empty; and said processor adding an identification of each adjudicated element applied to each data point of the measurement data to the modification history chain;
    said processor transforming the adjudicated measurement data into operational data by: merging sets of the adjudicated data into a single set of data based on a feature that is common to the sets of adjudicated data; and splitting the single set of data into a plurality of groups of data corresponding to a plurality of sub-periods of the at least one period of time during which the service has been performed; and
    said processor qualifying the operational data by: determining differentials by which the identified data points differ from specified targets; and determining, from the differentials, a margin by which the identified data points contribute to meeting or not meeting the specified targets, wherein said qualifying identifies data points selected from the group consisting of good data points of the operational data meeting the specified targets, bad data points of the operational data not meeting the specified targets, and combinations thereof.

4. The system of claim 3, wherein the measurement data are stored in the datastore processor.

* * * * *